United States Patent [19]

Ishihara et al.

[11] Patent Number: 5,555,020

[45] Date of Patent: Sep. 10, 1996

[54] SOLID-STATE IMAGING APPARATUS

[75] Inventors: Hideaki Ishihara, Hachioji; Kiyoshi Tsuji, Musashino; Akihiko Mochida, Hachioji, all of Japan

[73] Assignee: Olympus Optical Co., Ltd., Tokyo, Japan

[21] Appl. No.: 412,202

[22] Filed: Mar. 27, 1995

Related U.S. Application Data

[63] Continuation of Ser. No. 52,909, Apr. 27, 1993, abandoned.

[30] Foreign Application Priority Data

Apr. 30, 1992 [JP] Japan .................................. 4-111812
Apr. 12, 1993 [JP] Japan .................................. 5-084923

[51] Int. Cl.⁶ .......................... H04N 5/235; H04N 5/225; H04N 5/335
[52] U.S. Cl. ......................... 348/221; 348/220; 348/296
[58] Field of Search .................................. 348/224, 229, 348/230, 296, 297, 388, 440, 441, 362; 358/335; H04N 5/235, 5/335, 5/225

[56] References Cited

U.S. PATENT DOCUMENTS

| | | | |
|---|---|---|---|
| 4,656,520 | 4/1987 | Hurst | 358/213.25 |
| 4,677,464 | 6/1987 | Yamaji et al. | 348/388 |
| 4,849,813 | 7/1989 | Hirao et al. | 348/440 |
| 5,101,273 | 3/1992 | Gillies et al. | 348/441 |
| 5,162,914 | 11/1992 | Takahashi et al. | 358/213.19 |
| 5,196,938 | 3/1993 | Blessinger | 358/213.19 |
| 5,247,367 | 9/1993 | Lee | 358/213.19 |
| 5,258,845 | 11/1993 | Kyuna et al. | 358/213.25 |
| 5,264,944 | 11/1993 | Takemura | 358/335 |

FOREIGN PATENT DOCUMENTS 63-98286  4/1988  Japan .

*Primary Examiner*—Wendy Garber
*Assistant Examiner*—Andrew B. Christensen
*Attorney, Agent, or Firm*—Armstrong, Westerman, Hattori, Mcleland & Naughton

[57] ABSTRACT

A solid-state imaging apparatus comprises a fast driving means that drives a solid-state imaging device at a high speed for the preservation time for one screen in a solid-state imaging device; that is, for one of time intervals corresponding to a plurality of divisions of a one-field period in a television signal mode, a fast transfer circuit for transferring pixel outputs of the solid-state imaging device at a high speed, field memories in which image signals sent from the fast transfer circuit are stored screen by screen, a selection output control circuit that reads the image signals stored screen by screen in the field memories by converting the time bases into the one for the one-field period in the television signal mode, and selectively outputs the plurality of read image signals depending on the state of a subject, and an adder for adding up the image signals selected by the selection output control circuit and providing an output image signal.

9 Claims, 10 Drawing Sheets

SOLID-STATE IMAGING APPARATUS

This application is a continuation of application Ser. No. 08/052,909 filed Apr. 27, 1993, now abandoned.

BACKGROUND OF THE INVENTION

1. Field of the Invention

The present invention relates to a solid-state imaging apparatus for reducing the preservation time for one screen in a solid-state imaging device and providing a photoelectrically-converted output.

2. Description of the Related Art

In recent years, an imaging apparatus using a solid-state imaging device such as a charge-coupled device (hereinafter, CCD) instead of an image pickup tube has become a mainstream. The solid-state imaging apparatus has various superb features the imaging apparatus using an image pickup tube does not have. Currently, an increase in the number of pixels determining resolution is contradictory to improvement of the sensitivity in photoelectric conversion. For instance, when an image sensor is used with the number of pixels increased but with the chip size unchanged, the area of the image sensor that can undergo photoelectric conversion becomes smaller. Consequently, the sensitivity deteriorates.

An apparatus for resolving the above drawback; that is, for extending a saturation limit for photoelectric conversion in a solid-state imaging device, and thus expanding a dynamic range has been disclosed in Japanese Patent Application No. 63-98286 and Japanese Patent Laid-Open No.61-244759. In this conventional imaging apparatus, the preservation time for one screen in the solid-state imaging device is reduced to one of multiple time intervals (1/n field period, where n denotes an integer) corresponding to multiple divisions of a one-field period in a television signal mode, and thus pixel outputs of the solid-state imaging device are transferred at a high speed. The pixel outputs transferred at a high speed are stored screen by screen in a memory means. The pixel outputs stored screen by screen in the memory means are then added up for multiple screens. The time bases of the pixel outputs are then converted into the one for the foregoing one-field period in the television signal mode. Finally, an output resulting from the addition is read using the converted time base.

According to the aforesaid arrangement, preservation of a single screen (or field) in the solid-state imaging device is achieved for a shorter period of time than the time for scanning one field in the normal television signal mode. The saturation limit in the solid-state device is therefore extended. For reading, pixel outputs for multiple screens (fields) are added up. The time bases of the pixel outputs are then converted into the one for one field in the normal television mode. Consequently, thermal noises and reading noises are minimized. This results in an improved signal-to-noise ratio and an expanded dynamic range.

In the conventional apparatus, preservation of charges for one screen (one field) in the solid-state imaging device is achieved for a shorter period of time than a one-field time in the normal television signal mode. During reading, however, since pixel outputs for multiple screens (fields) are added up, an exposure time or a shutter speed becomes equal to the one-field time in the normal television signal mode. Specifically, when a subject moving faster than the one-field time is photographed, the image is blurred to deteriorate the image quality.

In efforts to prevent blurring of an image, the employment of an electronic shutter for varying the time of storing charges in the solid-state imaging device is conceivable. When a fast-moving subject is imaged, since the preservation time becomes shorter, the sensitivity deteriorates. To compensate for this deterioration, signals are amplified electrically. This results in a poor signal-to-noise ratio and a complex structure of an apparatus.

OBJECTS AND SUMMARY OF THE INVENTION

An object of the present invention is to provide a solid-state imaging apparatus capable of coping with a wide range of variations in illumination and providing optimal image quality depending on the state of a subject.

Another object of the present invention is to provide a solid-state imaging apparatus capable of changing the exposure time for a solid-state imaging device depending on the state of a subject and providing optical image quality for every subject.

Yet another object of the present invention is to provide a solid-state imaging apparatus capable of automatically changing the exposure time for a solid-state imaging device by identifying the state of a subject and of providing optimal image quality depending on the state of a subject all the time.

The present invention comprises a fast driving means that drives a solid-state imaging device at a high speed for a preservation time for one screen in the solid-state imaging device; that is, for one of time intervals corresponding to multiple divisions of a one-field period in a television signal mode, a fast transfer means for transferring pixel outputs of the solid-state imaging device at a high speed, a memory means in which image signals sent from the fast transfer means are placed screen by screen, a selection output control means that reads the image signals stored screen by screen in the memory means by converting the time bases of the image signals into the one for a one-field period in the television signal mode, and selectively outputs the read multiple image signals depending on the state of a subject; and an adding means for adding up image signals selected by the selection output control means and providing an output image signal.

The other features and advantages of the present invention will be fully apparent from the description below.

BRIEF DESCRIPTION OF THE DRAWINGS

FIG. 1 is a block diagram showing a configuration of a solid-state imaging apparatus;

FIG. 2 shows waves representing the reading pulses and transfer pulses of a solid-state imaging device;

FIG. 3 is an explanatory diagram showing the relationship between the preservation time and the charges preserved in a solid-state imaging device;

FIG. 4 is an explanatory diagram for operations showing the writing and reading timing for multiple field memories FIG. 5 is an explanatory diagram for operations in which field image signals are read from multiple field memories and input to an adder depending on the state of a subject;

FIG. 6 is a block diagram showing a configuration of a solid-state imaging apparatus;

FIG. 7 is a block diagram showing a configuration of an image state identification means;

FIG. 8 is an explanatory diagram for operations that explains the operations of an image state identification means;

FIG. 9 is a block diagram showing a configuration of a solid-state imaging apparatus; and FIG. 10 is a block diagram showing a configuration of an image state identification means.

DETAILED DESCRIPTION OF THE PREFERRED EMBODIMENTS

FIGS. 1 to 5 show an embodiment of the present invention.

Figure 1:
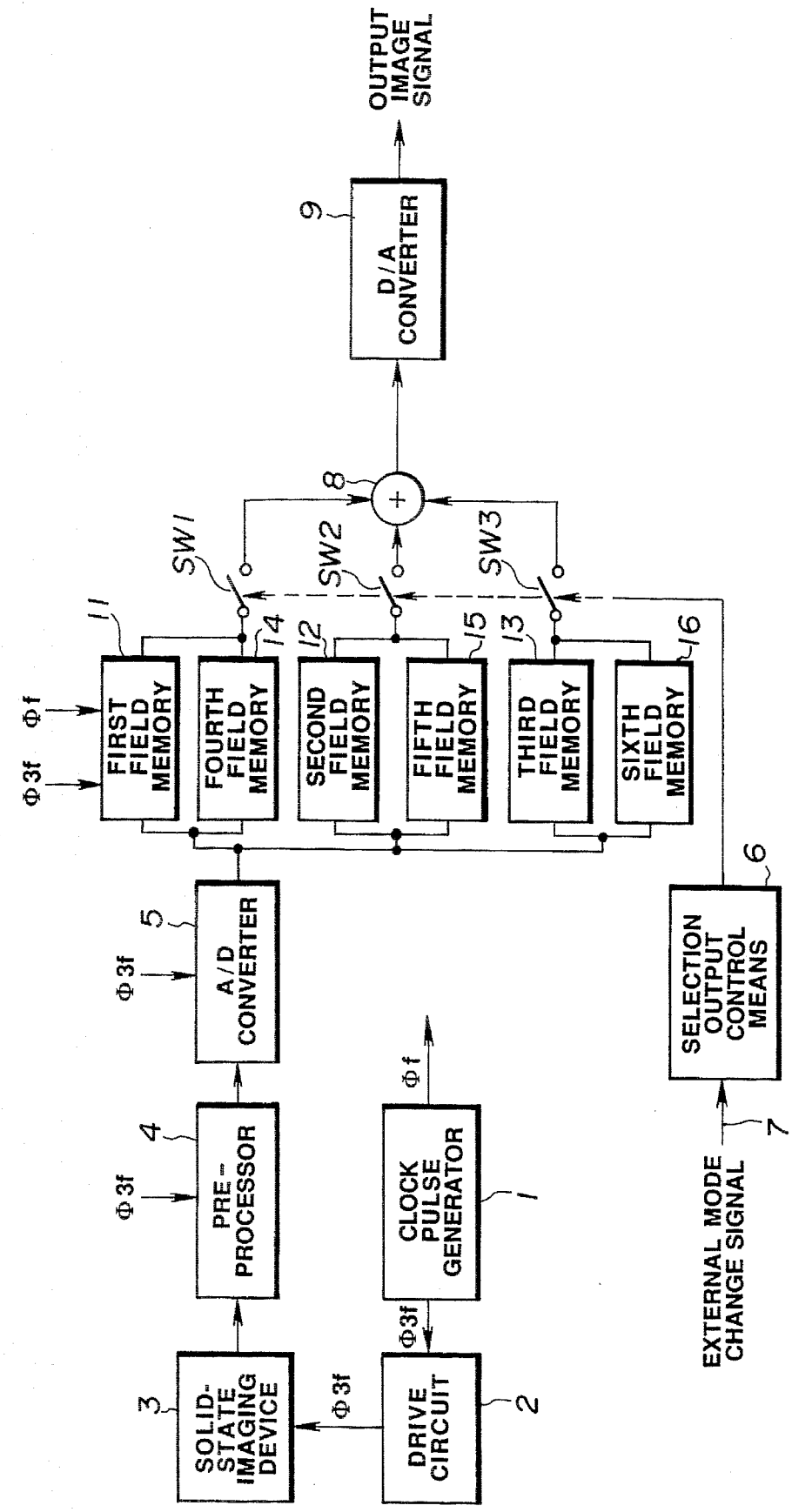
FIGS. 1 to 5 relate to an embodiment of the present invention.

As shown in FIG. 1, a solid-state imaging apparatus of the present embodiment includes a clock pulse generator for generating clock pulses $\phi f$ each having a duration that agrees with a one-field period in a normal television signal mode and clock pulses $\phi 3f$ each having a frequency that is a triple of that of $\phi f$. The clock pulses $\phi 3f$ from the clock pulse generator 1 are supplied to a drive circuit 2 serving as a fast driving means and fast transfer means. With the clock pulses $\phi 3f$, the drive circuit 2 drives a solid-state imaging device 3 such as a CCD at a high speed. Specifically, transfer and drive are performed at a triple frequency of a normal one within the solid-state imaging device 3.

The solid-state imaging device 3 is connected to a preprocessor 4. Pixel outputs photoelectrically-converted by the solid-state imaging device 3 are sequentially transferred with clock pulses $\phi 3f$. The transferred pixel outputs of the solid-state imaging device 3 are subjected to various signal processing by the preprocessor 4. The preprocessor 4 is connected to an A/D converter 5. Image signals or outputs of the preprocessor 4 are converted into digital values by the A/D converter 5. At this time, the preprocessor 4 and A/D converter 5 input the clock pulses $\phi 3f$ each having a triple frequency of a normal one which are similar to those sent to the solid-state imaging device 3. According to the above timing, signal processing and A/D conversion are carried out at a high speed.

An output terminal of the A/D converter 5 is connected to multiple (six in this embodiment) field memories 11, 12, 13, 14, 15, and 16 constituting a memory means. Digitized image signals are stored screen by screen in these field memories 11 to 16. The field memories 11 to 16 are provided with clock pulses $\phi 3f$ each having a triple frequency of a normal one and normal clock pluses $\phi f$. Writing in each of the field memories 11 to 16 is achieved for a one-third time of a one-field period. Image signals stored in the field memories 11 to 16 are read for a one-field period in the normal television signal mode. The outputs of the field memories 11 to 16 are input to an adder 8 serving as an adding means via output selection switches SW1, SW2, and SW3. The adder 8 adds up the selected image signals.

Control input terminals of the output selection switches are connected to a selection output control means 6 that controls the selection of the outputs of the field memories to be added by the adder 8. In response to an external mode change signal 7 provided depending on the state of a subject, the selection output control means 6 switches the on and off states of the output selection switches SW1, SW2, and SW3. The adder 8 is connected to a D/A converter 9. An output signal of the adder 8 is converted into an analog signal which is then supplied as an output image signal.

Next, the operation of this embodiment will be described.

Figure 2A:
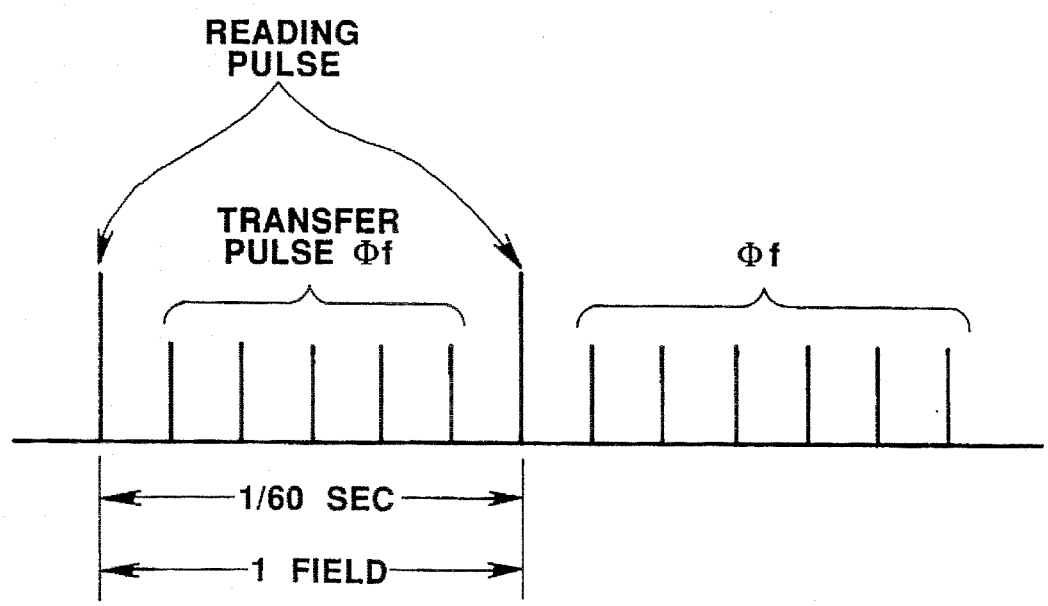
Figure 2B:
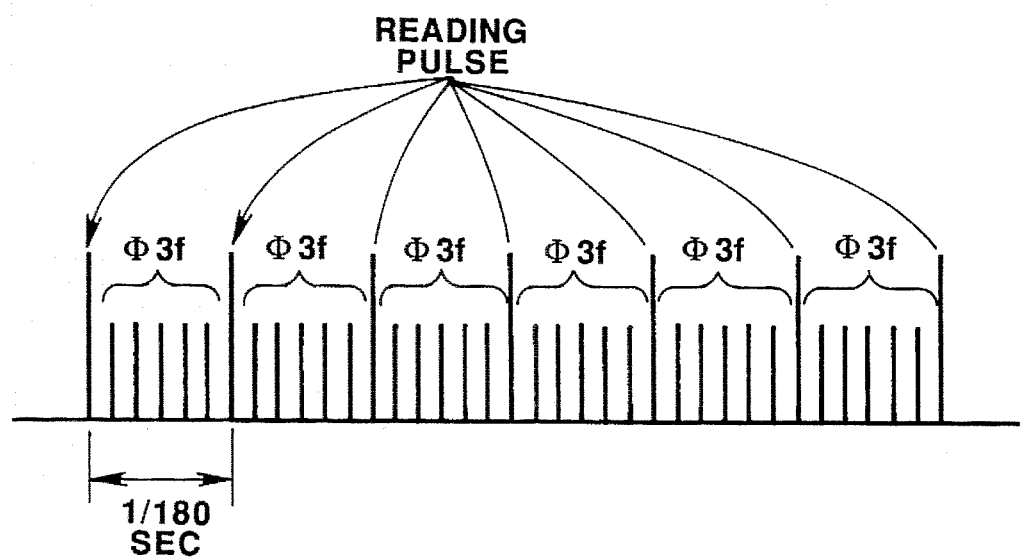
Figure 3A:
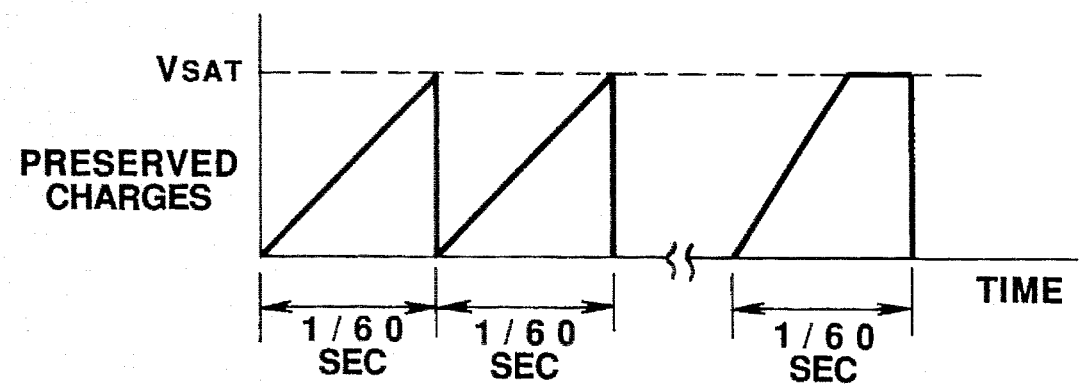
Figure 3B:
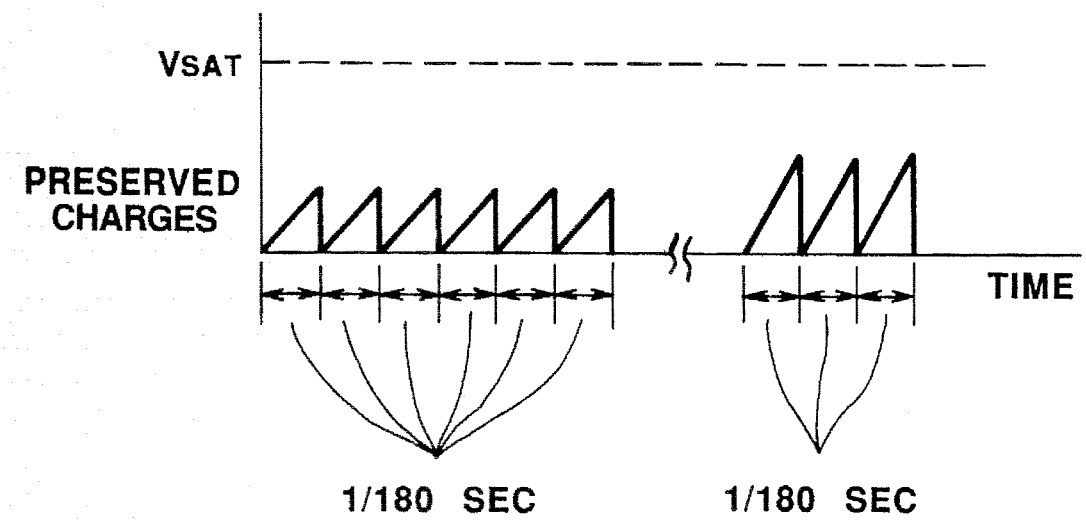

With clock pulses $\phi 3f$ each of which has a triple frequency of a normal one and is generated by the clock pulse generator 1, the drive circuit 2 drives the solid-state imaging device 3 at a high speed with a triple frequency of a normal one. As shown in FIG. 2A and 3A, the preservation time in a normal solid-state imaging device is 1/60 sec. that is a one-field period in a normal television signal mode. Pixel outputs photoelectrically-converted by the solid-state imaging device are sequentially transferred from the solid-state imaging device with clock pulses $\phi f$ each having a duration of 1/60 sec. that is the time for scanning one screen (one field). On the other hand, in this embodiment, as shown in FIGS. 2B and 3B, the preservation time for one screen field) in the solid-state imaging device 3 is 1/180 sec. or a one-third of 1/60 sec. that is a one-field period in the normal television signal mode. Pixel outputs photoelectrically-converted by the solid-state imaging device 3 are sequentially transferred with clock pulses $\phi 3f$ each having a duration of 1/180 sec. that is a time for scanning one screen (field). The transferred outputs of the solid-state imaging device 3 are subjected to various signal processing by the preprocessor 4, and then converted into digital values by the A/D converter 5.

Among the digitized image signals, the image signals for three consecutive screens (fields), which have been preserved at intervals of 1/180 sec. in the solid-state imaging device 3 are allocated to and written in the first field memory 11, second field memory 12, and third field memory 13. The succeeding image signals are then written in the fourth field memory 14, fifth field memory 15, and sixth field memory 16.

Figure 4:
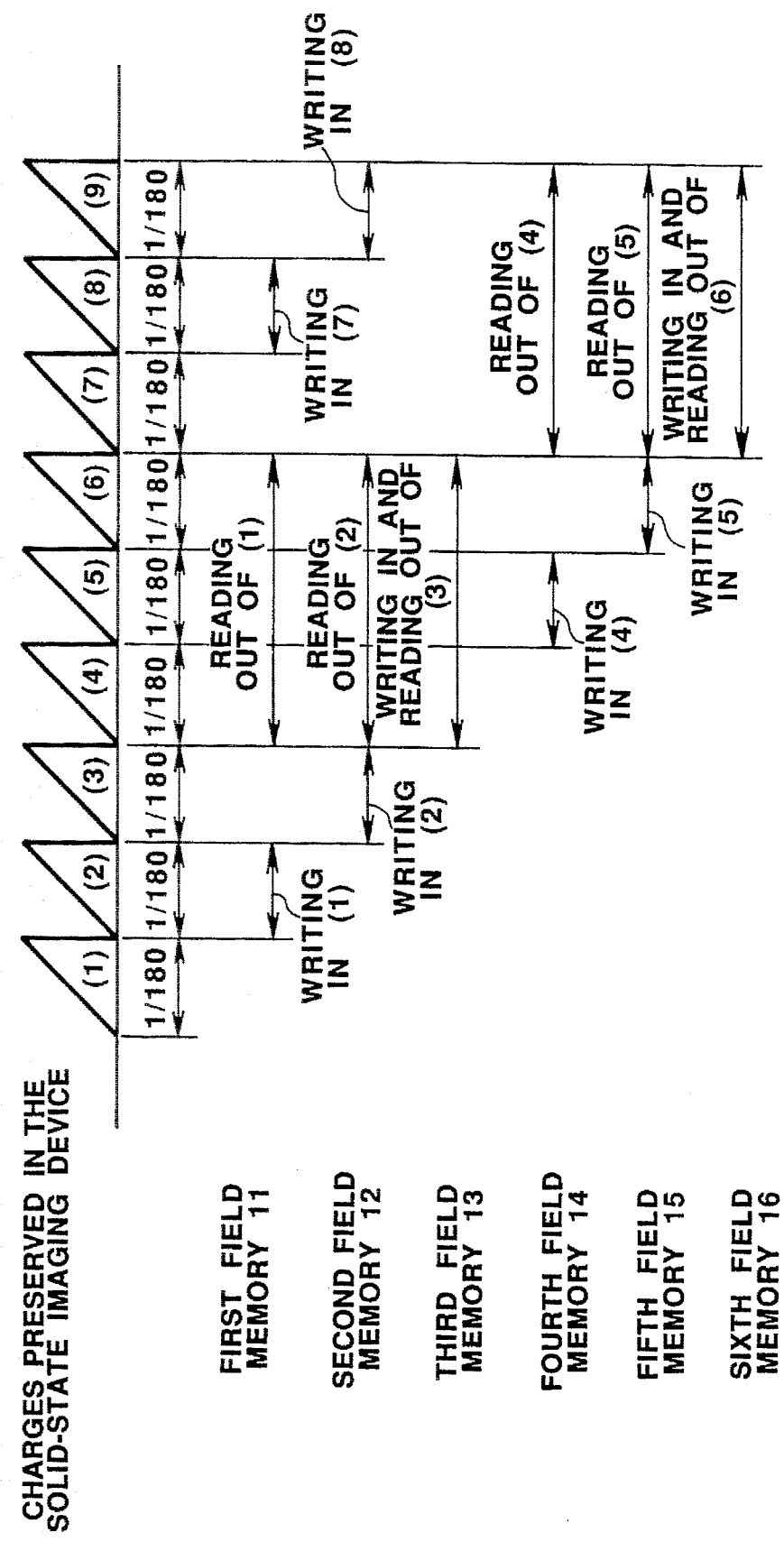

Writing image signals into the field memories 11 to 16 and reading the stored signals will be described with reference to FIG. 4.

Noted first are the first, second, and third field memories 11, 12, and 13. An image signal preserved in a field (1) in the solid-state imaging device 3 for 1/180 sec. is written into tile first field memory 11 with a clock pulse $\phi 3f$ generated according to the timing of reading the image signal. Writing into the first field memory 11 is achieved for a interval of 1/180 sec. while a succeeding field (2) in the solid-state imaging device 3 is being charged. After writing into the first field memory 11 is completed, reading the digital image signal written in the first field memory 11 is started with a pulse $\phi f$ generated according to the timing in the normal television signal mode.

When writing the image signal in the field (1) into the first field memory 11 terminates, the solid-state imaging device 3 has completed charging the field (2). The image signal in the field (2) is written into the second field memory 12 with a clock pulse $\phi 3f$. Similarly to writing into the first field memory 11, writing into the second field memory 12 is achieved for an interval of 1/180 sec. while the solid-state imaging device 3 is charging a succeeding field (3). When writing into the second field memory 12 terminates, reading the digital image signal written in the second field memory 12 is started with a pulse $\phi f$ generated according to the normal television signal-mode timing.

Similarly to writing the image signal into the field (2), when writing the image signal in the field (2) into the second field memory 12 terminates, the solid-state imaging device 3 has completed charging the field (3). The image signal in the field (3) is written into the third field memory 13 with a clock pulse φ3f. A clock pulse φf has also been generated since the start of writing into the third field memory 13. The image signal in the field (3) is therefore written and read at the same time.

Reading the image signal of the field (1) from the first field memory 11, reading the image signal of the field (2) from the second field memory 12, and reading the image signal of the field (3) from the third field memory are started according to the same timing, and achieved for 1/60 sec.

The image signals in the subsequent fields (4), (5), and (6) are written into the fourth, fifth, and sixth field memories 14, 15, and 16 similarly to writing into the first, second, and third field memories, and then read out simultaneously for 1/60 sec. As for the image signals in the fields (7), (8), (9) and so on, the image signals in three consecutive fields are written alternately in the first, second, and third field memories 11, 12, and 13 or in the fourth, fifth, and sixth field memories 14, 15, and 16. The image signals of three fields are read out simultaneously.

Figure 5:
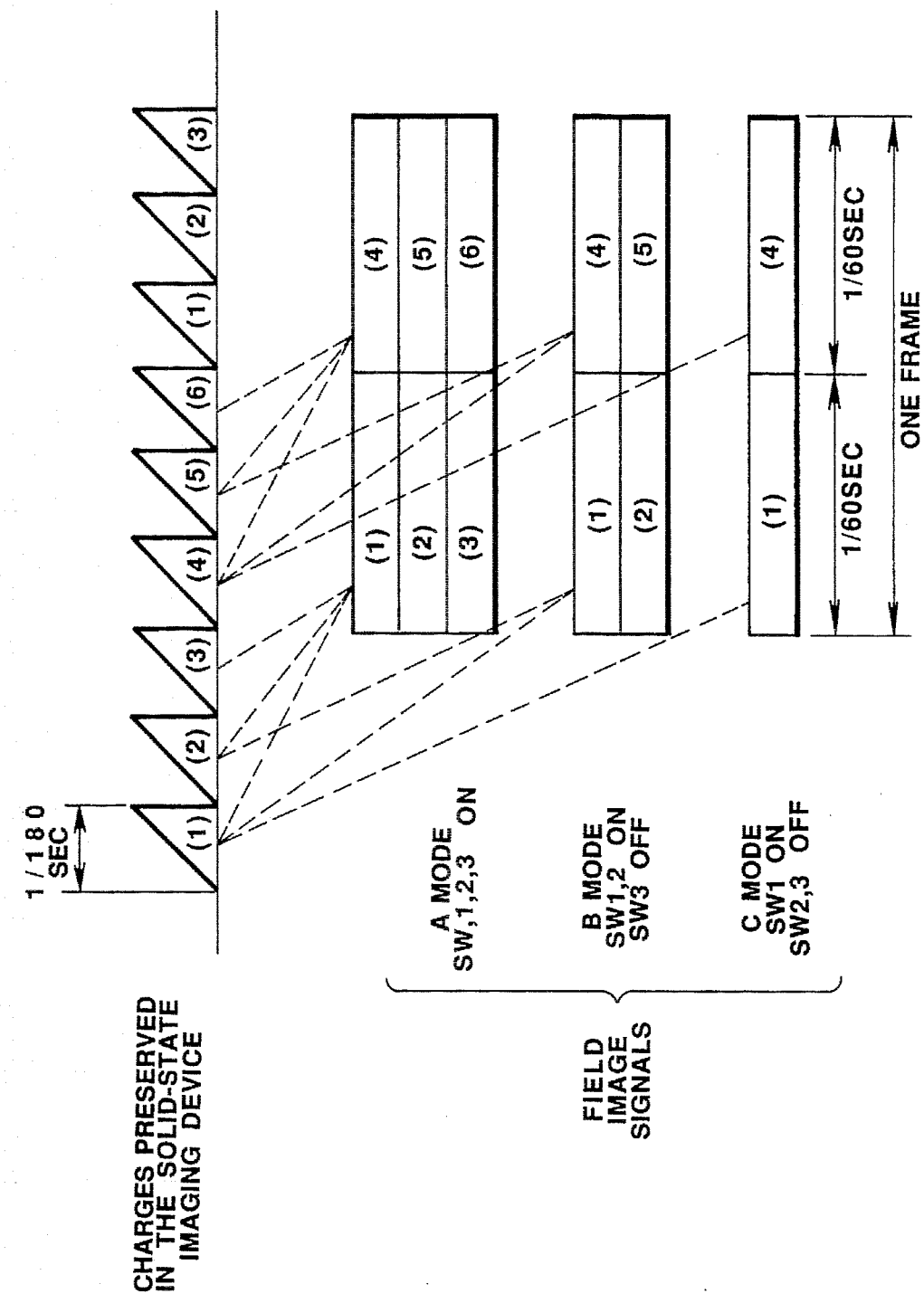

Next, the read field image signals are input to the adder 8 via the output selection switches SW1, SW2, and SW3. Thus, the selected image signals are added up. The output selection switches SW1, SW2, and SW3 are turned on or off by the selection output control means 6 according to the external mode change signal 7 fed depending on the state of a subject. FIG. 5 shows three control modes the external mode change signal 7 represents depending on the state of a subject.

Various combinations of field image signals to be input to the adder 8 are conceivable. Herein, three combinations (A, B, and C modes) will be described. When the A mode is selected with the external mode change signal 7, the output selection switches SW1, SW2, and SW3 are all on. When read from the respective field memories, the image signals of three fields (1), (2), and (3) or (4), (5), and (6) are input to the adder 8 and added up. Specifically, in the A mode, the adder 8 outputs a digital signal corresponding to charges preserved for an exposure time of 1/60 sec. that is a one-field period in the normal television signal mode.

The digital signal output by the adder 8 is converted into an analog signal by the D/A converter 9. An output image signal is then provided. The image signal corresponding to the charges preserved for a one-field period of 1/60 sec., which has been converted into an analog signal, is, as shown in FIG. 3B, a sum of charges which are much less than a saturation limit $V_{SAT}$ even for a subject with a high luminance and preserved in three fields. High-quality images can thus be formed, wherein the amount of light saturated in a color carrier has increased greatly, and coloring does not become irregular even in imaging the high-luminance portion of a subject. Furthermore, the dynamic range has expanded been substantially expanded. The image signals read from the three field memories 11, 12, and 13 or 14, 15, and 16 are added up, which halves random noises, reduces dark current, and totally improves image quality. The A mode is effective when a subject is motionless or moving slowly, and provides high-quality images.

When the B mode is selected with the external mode change signal 7, the output selection switches SW1 and SW2 are on and the output selection switch SW3 is off. The image signals of two fields (1) and (2) or (4) and (5) are read from the respective field memories, and then input to the adder 8 and added up. Specifically, in the B mode, the adder 8 outputs a digital signal corresponding to charges preserved in an exposure time of 1/90 sec. After the digital signal is converted into an analog signal by the D/A converter 9, an output image signal is provided. This means that the number of image signals to be added up is smaller by one than that in the A mode. The signal-to-noise ratio is slightly poorer than that in tile A mode. The exposure time becomes, however, shorter. When a fast-moving subject is imaged, blurring can therefore be prevented. For photography of a fast-moving subject, the B mode should be selected to obtain optimal output images.

When the C mode is selected with the external mode change signal 7, only the output selection switch SW1 is on and the output selection switches SW2 and SW3 are off. Therefore, the image signal of one field (1) or (4) is read from the associated field memory, and then input to the adder and added up. Specifically, in the C mode, the adder 8 outputs a digital signal corresponding to charges preserved for an exposure time of 1/180 sec. After the digital signal is converted into an analog signal by the D/A converter 9, an output image signal is provided. Consequently, the signal-to-noise ratio becomes poorer than that in the B mode, but the exposure time is much shorter. Even when a subject moving very fast is imaged, blurring can therefore be prevented perfectly. When a subject moves considerably fast, the C mode should be selected to obtain optimal output images without blurs.

As described above, the exposure time for the solid-state imaging device can be changed by switching the control mode represented by the external mode change signal 7 and thus modifying the number of field image signals to be added up. Consequently, optimal image quality can be provided for every subject.

In the above description, the external mode change signal 7 is used to control the output selection switches SW1, SW2, and SW3, and thus field image signals to be added by the adder 8 are selected. Alternatively, an actual image signal may be analyzed to identify the state of a subject, and thus the output selection switches SW1, SW2, and SW3 may be controlled. FIGS. 6 to 10 show a variant having such an image state identification means.

Figure 6:
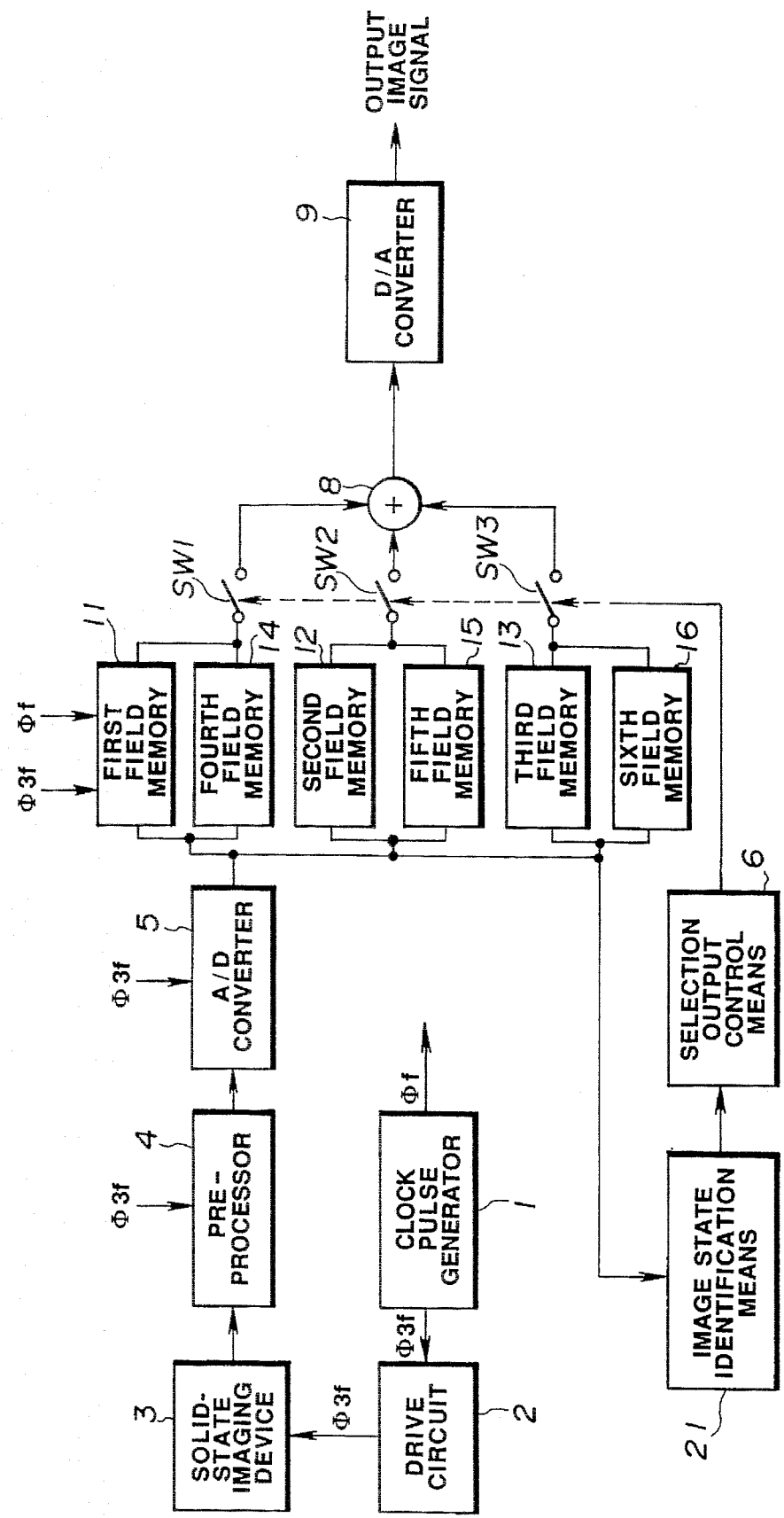
FIGS. 6 to 8 relate to the first variant having an image state identification means.
Figure 7:
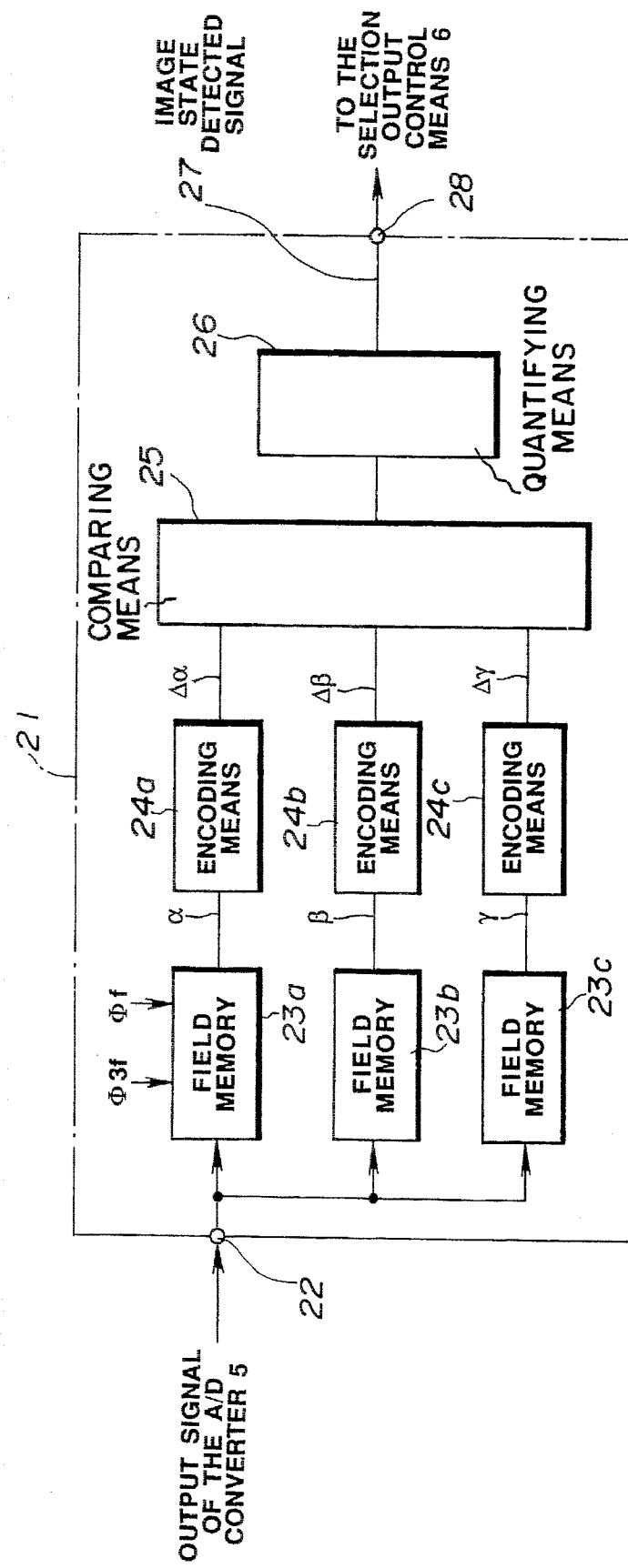
Figure 8:
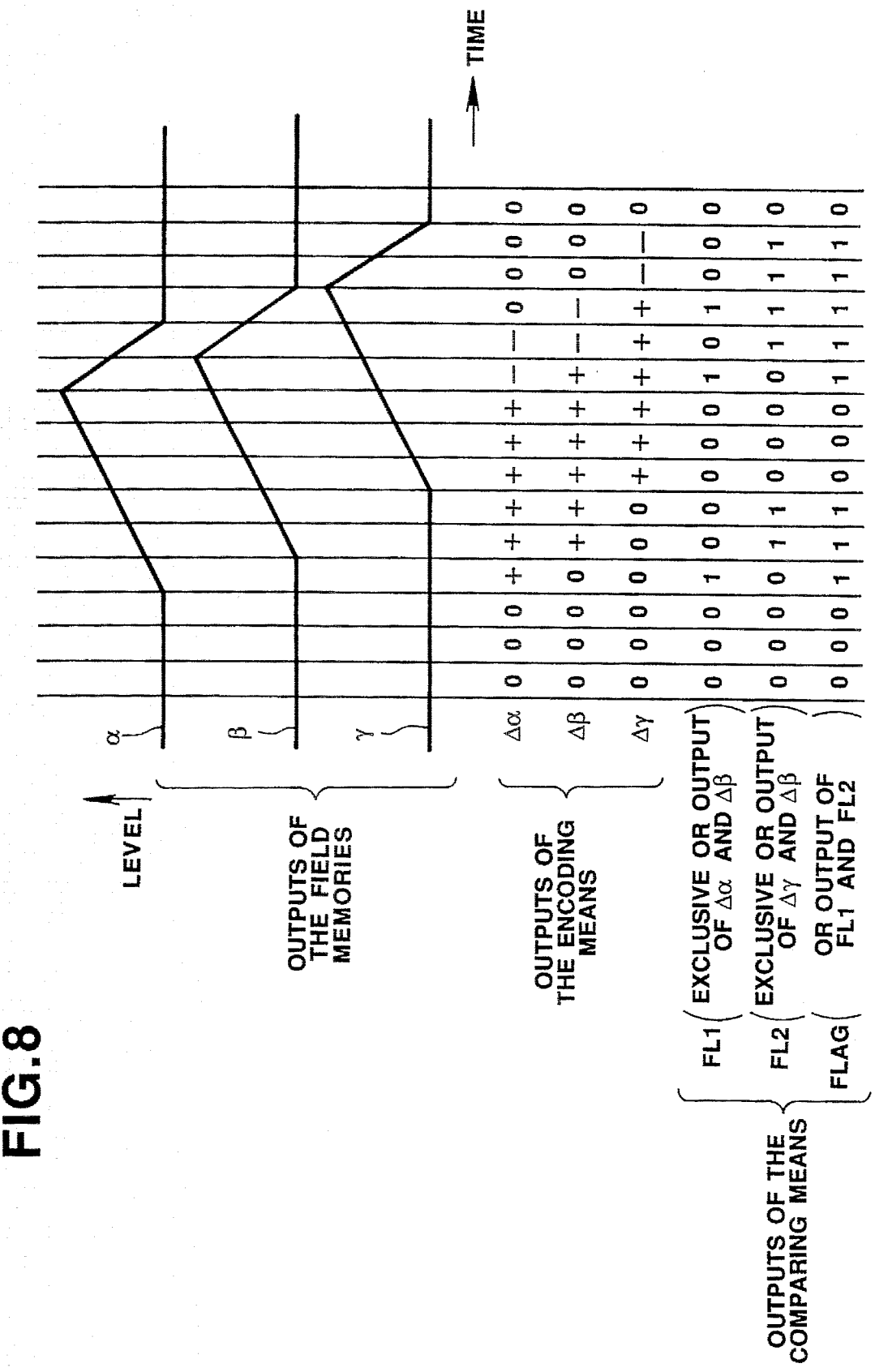

FIGS. 6 to 8 show the first variant having an image state identification means.

In the first variant, as shown in FIG. 6, an image state identification means 21 is installed to input image signals provided by an A/D converter 5. The image state identification means 21 identifies the state of a subject image and supplies an image-state detected signal to a selection output control means 6, in response to the image-state detected signal sent from the image state identification means 21, the selection output control means 6 controls the on or off states of output selection switches SW1, SW2, and SW3. The other components are identical to those in the previous embodiment.

FIG. 7 shows an example of a configuration of the image state identification means 21.

The image state identification means 21 detects a quantity of movement in a subject image. The image state identification means 21 comprises field memories 23a, 23b, and 23c in which image signals input via an image signal input terminal 22 thereof connected to the output terminal of the A/D converter 5 are placed screen by screen sequentially, encoding means 24a, 24b, and 24c for encoding the image signals read simultaneously from the field memories 23a, 23b, and 23c into values representing the shifts in level in respective images, a comparing means 25 for comparing among the encoded signals output by the encoding means 24a, 24b, and 24c, and a quantifying means 26 for quantifying a compared output of the comparing means.

The field memories 23a, 23b, and 23c, similarly to the field memories 11 to 16, are provided with clock pulses ϕ3f each having a triple frequency of a normal one and normal clock pulses ϕf. Writing in the field memories 23a, 23b, and 23c is achieved for a one-third time of a one-field period. The image signals stored in the field memories 23a, 23b, and 23c are read and synchronized for a one-field period in the normal television signal mode. The synchronized image signals read from the field memories 23a, 23b, and 23c are indicated with α, β, and γ.

Each of the encoding means 24a, 24b, and 24c calculates the difference between pixel outputs adjoining on the time base of each of synchronized image signals, and convert the difference signals into base-n values. The image signals are encoded to yield n kinds of directional vectors representing the shifts in level. The encoded signals output by tile encoding means 24a, 24b, and 24c are indicated as Δα, Δβ, and Δγ.

The comparing means 25 compares among the encoded signals sent from the encoding means 24a, 24b, and 24c. The encoded signals are thus correlated. The quantifying means 26 counts the outputs compared by the comparing means 25 for a specified period, thus achieving quantification. Consequently, the state of a subject image (a quantity of movement in an image) is detected, and then fed on an image-state detected signal 27 to the selection output control means 6 via an output terminal 28.

The operation of the image state identification means 21 having the aforesaid configuration will be described with reference to FIG. 8.

The levels of the image signals α, β, and γ synchronized in the field memories 23a, 23b, and 23c vary time-sequentially. For example, in the upper part of FIG. 8, the levels of the α, β, and γ signals are indicated on the axis of ordinates and the time is indicated on the axis of abscissas. When the encoding means 24a, 24b, and 24c encode the α, β, and γ signals, Δα, Δβ, and Δγ are provided as shown in the middle of FIG. 8. The encoding means 24a, 24b, and 24c convert the signals into ternary values. Encoded signals are represented with three codes of +(increased level),—(decreased level), and 0 (constant level). In other words, the encoded signals are signals in which the level shifts in image signals are encoded.

Next, the comparing means 25 compares among the three encoded signals. The comparing means 25 performs three logical operations to provide the outputs of, as shown in the lower part of FIG. 8, FL1 (output of exclusive OR of Δα and Δβ), FL2 (output of exclusive OR of Δγ and Δβ), and FLAG (output of OR of FL1 and FL2). The encoded signals Δα, Δβ, and Δγ are thus correlated with one another.

When the encoded signals are tightly correlated with one another, the encoded signals agree with or approximate to one another. When no correlation is observed, the encoded signals do not agree with or approximate to one another. The encoded signals of image signals stored screen by screen are correlated to detect a movement in an image. In other words, when an image moves, the encoded signals (ternary signals of differences) sampled at specified intervals disagree with one another. As apparent from the comparison between FL1 and FL2, the larger the quantity of movement is, the longer the period of outputting a high level as FLAG becomes.

The quantifying means 26 counts high-level outputs carried by FLAG in units of one field, thus defining the output period. A quantified image-state detected signal 27 is output to the selection output control means 6.

The selection output control means 6 switches the on and off states of the output selection switches SW1, SW2, and SW3 according to the image-state detected signal 27 representing the state of an image (movement in an image). The on and off states of the output selection switches SW1, SW2, and SW3 are switched in the same manner as that three control modes are switched with the external mode change signal 7. Thus, when the control modes are switched for the selection output control means 6 according to the image-state detected signal 27 that is a result of identifying the state of an image, field image signals to be supplied are selected automatically depending on the identified state of a subject. The selected image signals are then added up by the adder and supplied as an output image signal.

As described above, in this variant, the state of a subject is identified to control the output selection switches SW1, SW2, and SW3 automatically. Optimal images can therefore be formed for every subject.

Figure 9:
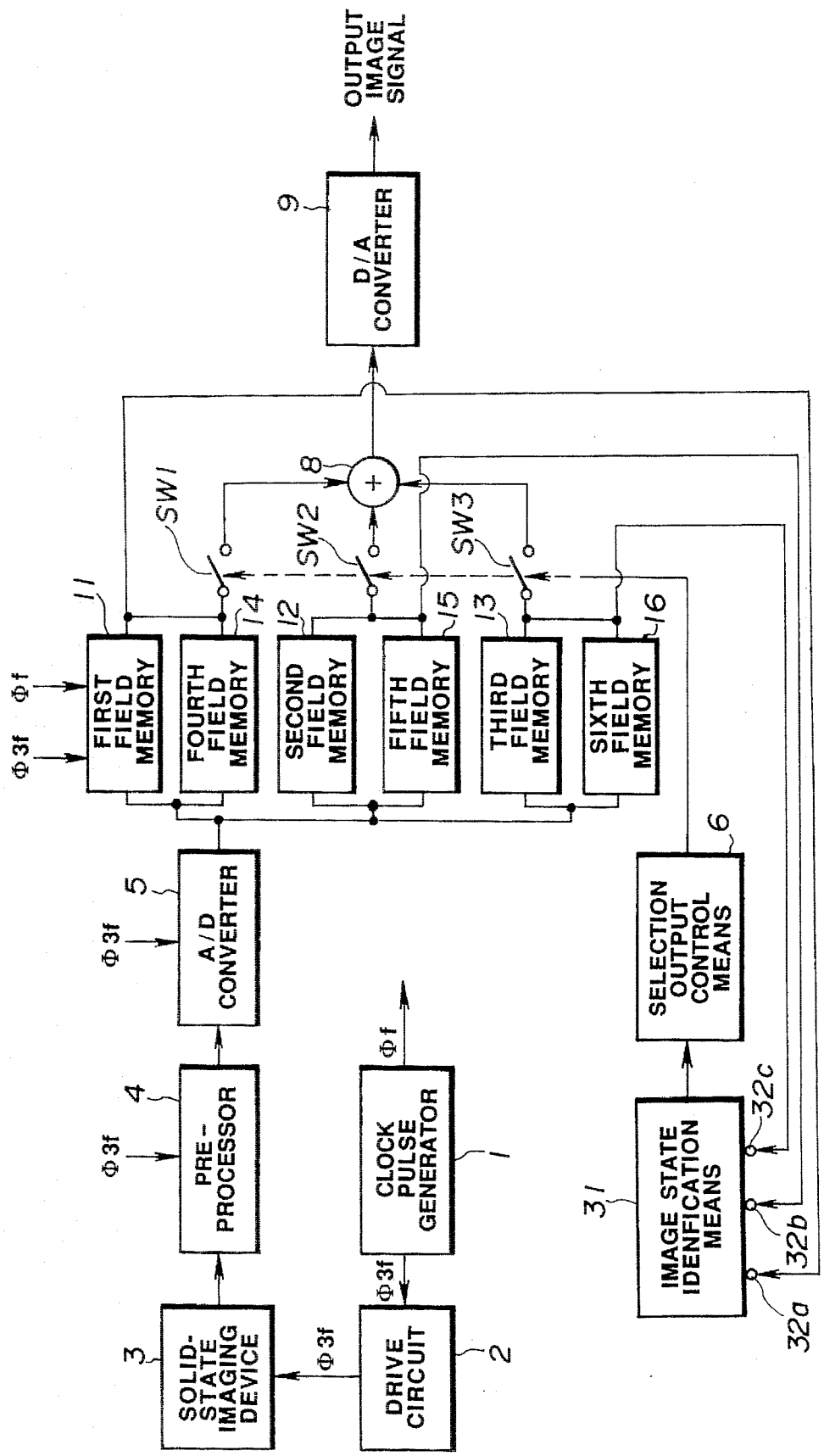
FIGS. 9 to 10 relate to the second variant having an image state identification means.
Figure 10:
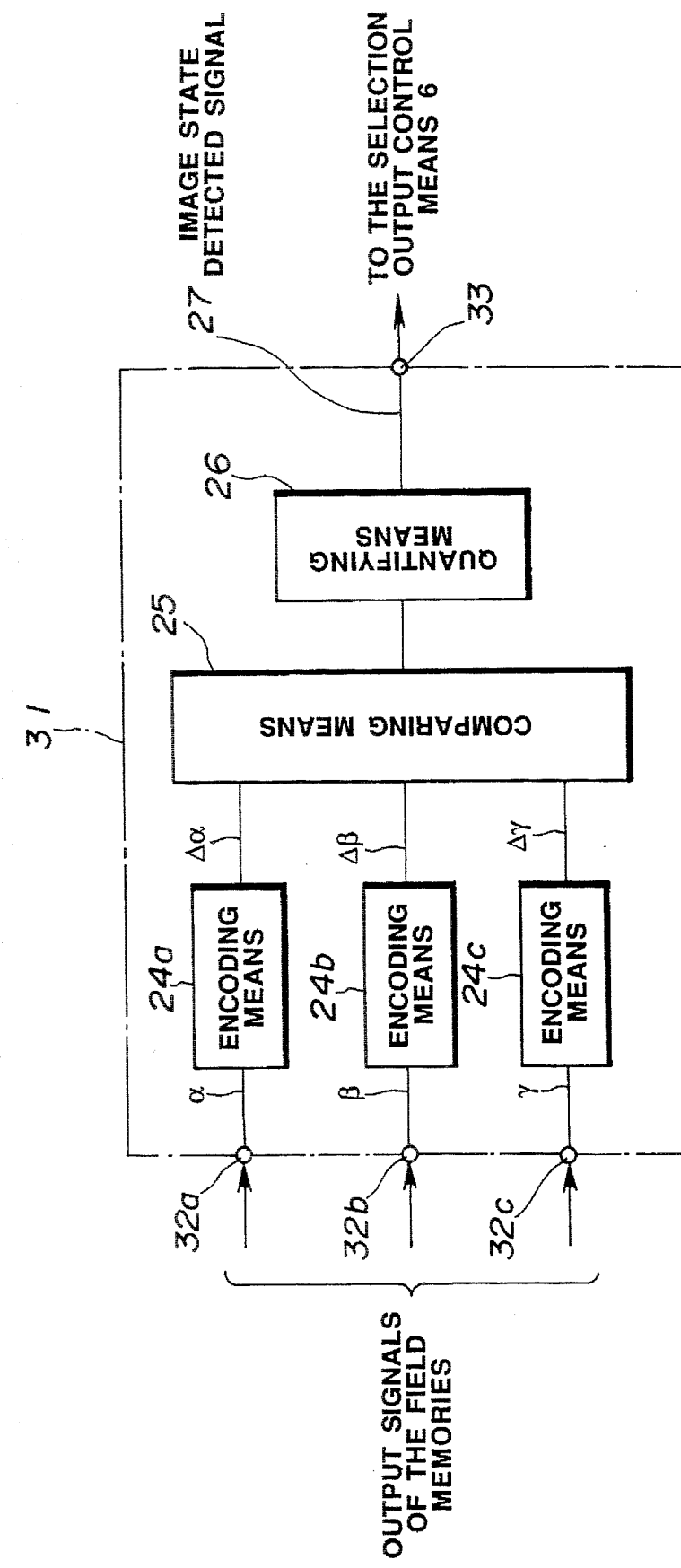

FIGS. 9 and 10 show the second variant having an image state identification means.

In the second variant similarly to the first variant, as shown in FIG. 9, an image state identification means is installed. Input terminals 32a, 32b, and 32c of the image state identification means 31 are connected to output terminals of field memories 11 to 16. The input terminals 32a, 32b, and 32c input image signals synchronized in the field memories 11 to 16.

The image state identification means 31 comprises, as shown in FIG. 10, encoding means 24a, 24b, and 24c, a comparing means 25, and a quantifying means 26 similarly to that in the first variant. An image-state detected signal 27 is output to a selection output control means 6 via an output terminal 33. The configuration and operation of the image state identification means 31 are identical to those of the image state identification means 21 in the first variant except that no field memories are included. The description will therefore omitted.

In the second variant, the outputs of the main field memories 11 to 16 are supplied as input signals to the image state identification means 31. The main field memories 11 to 16 have capabilities of the field memories 23a, 23b, and 23c included in the image state identification means 21 in the first variant for synchronization. This simplifies the circuitry for identifying the state of a subject.

As described above, according to this embodiment, a one-field period in a normal television signal mode is divided into multiple time intervals. During each time interval, a solid-state imaging device preserves data for one screen, and then transferred the data to a field memory at a high speed. Image outputs for multiple screens stored in the field memories are selectively added up depending on the state of a subject, and then read out. The exposure time for the solid-state imaging device is thus varied. Even simple control can cope with a wide range of variations in illumination and provide optimal image quality depending on the state of a subject.

In this embodiment, as described previously, the control mode is available in three kinds. Another combinations of field image signals to be added up are conceivable. The number of control modes is therefore not limited to the aforesaid three kinds. Driving a solid-state imaging device, transferring image signals, and writing in field memories are achieved for a time that is a one-third of a one-field period in the normal television signal mode. Alternatively, these operations may be performed at a high speed that is higher than the triple speed.

As described so far, according to the present invention, the exposure time for a solid-state imaging device is varied by selecting outputs of a memory means depending on the state of a subject. A wide range of variations in illumination can be coped with and optimal image quality can be provided depending on the state of a subject.

In the present invention, it will be apparent that a wide range of different embodiments can be formed on the basis of the present invention without departing from the spirit and scope of the invention. This invention will be limited to the appended claims but not restricted to any specific embodiments.

What is claimed is:

1. A solid-state imaging apparatus, comprising:

a fast driving means that drives a solid-state imaging device at a high speed for a charge accumulation time for one screen in the solid-state imaging device obtaining a signal which can be displayed as an independent screen; that is, for one of time intervals corresponding to a plurality of divisions of a one-field period in a television signal mode, so as to obtain a pixel output which can be displayed as an independent screen in every time interval;

a fast transfer means for transferring pixel outputs of said solid-state imaging device at a high speed;

a memory means in which image signals sent from said fast transfer means are stored screen by screen;

a selection output control means that reads the image signals stored screen by screen in said memory means by converting the time bases into the one for a one-field period in said television signal mode, and automatically selects for output one or more of the plurality of read image signals depending on a state of a subject; and an adding means for adding the image signals selected by said selection output control means and providing an output image signal.

2. A solid-state imaging apparatus according to claim 1, wherein said fast driving means drives a solid-state imaging device at a high speed for the charge accumulation time for one screen that is 1/n (where, n is an integer equal to or larger than 2) of a one-field period in the television signal mode.

3. A solid-state imaging apparatus according to claim 1, wherein said memory means includes field memories which in number are double the number of divisions of a drive time, that is, double a result of division of said one-field period in the television signal mode by the charge accumulation time for one screen in the solid-state imaging device driven by said fast driving means, and stores the image signals, which have been sent from said fast transfer means, screen by screen sequentially in the respective field memories; and said selection output control means reads image signals stored screen by screen in said field memories simultaneously at intervals of each division of said drive time by converting the time bases into the one for said one-field period in the television signal mode, and selectively outputs the plurality of read image signals depending on said state of a subject.

4. A solid-state imaging apparatus according to claim 3, further comprising an image state identification means for identifying a state of a subject image based on the image signals acquired from pixel outputs of said solid-state imaging device by computing whether motion of the subject image is below a predetermined minimum motion, between the predetermined minimum motion and a predetermined maximum motion, or above said predetermined maximum motion, wherein said selection output control means selectively outputs said image signals read simultaneously from said field memories at intervals of each division of said drive time according to a subject's motion, so that when a subject makes a motion which is determined by said image state identification means to be less than said predetermined minimum motion, all of said image signals will be selected and output; when a subject makes a motion which is determined by said image state identification means to be greater than said predetermined maximum motion, only one of said image signals will be selected and output; and when a subject makes a motion which is determined by said image state identification means to be intermediate between said predetermined maximum motion and said predetermined minimum motion, a number of signals corresponding to a quantity representing the subject's motion are selected and output.

5. A solid-state imaging apparatus according to claim 3, wherein said selection output control means inputs a control mode change signal, which can represent a plurality of control modes associated with states of a subject, from an external unit, and selectively outputs the image signals read simultaneously from said field memories at intervals of each division of said drive time according to the control mode specified by the control mode change signal.

6. A solid-state imaging apparatus according to claim 3, further comprising an image state identification means for identifying a state of a subject image based on the image signals acquired from pixel outputs of said solid-state imaging device;

said selection output control means selectively outputting the image signals, which have been read from said field memories simultaneously at intervals of each division of said drive time, depending on said state of a subject which is detected by said image state identification means.

7. A solid-state imaging apparatus according to claim 6, wherein said image state identification means includes an encoding means that inputs image signals acquired from pixel outputs of said solid-state imaging device by distributing the signals, which have been acquired for each said charge accumulation time for one screen in the solid-state imaging device driven by said fast driving means, into a plurality of memory systems time-sequentially, and encodes the image signals of the respective memory systems to produce encoded image signals which represent the level shifts in the respective ones of said plurality of memory systems;

a comparing means for comparing and correlating among the encoded signals output by the memory systems of the encoding means; and a quantifying means that quantifies the compared output of said comparing means and outputs an image-state detected signal representing a quantity of movement in a subject image.

8. A solid-state imaging apparatus according to claim 7, wherein said image state identification means includes a plurality of field memories in which image signals acquired from pixel outputs of said solid-state imaging-device are stored screen by screen sequentially; and said image state identification means reads image signals simultaneously from the plurality of field memories, supplies the image signals to said encoding means, and then generates a signal representing a quantity of movement in a subject image.

9. A solid-state imaging apparatus according to claim 7, wherein said image state identification means is connected to the output terminals of a plurality of field memories constituting said memory means, supplies the image signals read from the plurality of field memories to said encoding means, and then generates a signal representing a quantity of movement in a subject image.

* * * * *